United States Patent [19]

Ahmad et al.

[11] Patent Number: 5,740,159

[45] Date of Patent: Apr. 14, 1998

[54] LOOPBACK MECHANISM FOR FRAME RELAY OAM

[75] Inventors: Khalid Ahmad, Nepean; Jan Medved, Ottawa, both of Canada

[73] Assignee: Northern Telecom Limited, Montreal, Canada

[21] Appl. No.: 652,061

[22] Filed: May 23, 1996

[51] Int. Cl.[6] .................................................. H04B 17/02
[52] U.S. Cl. ..................... 370/249; 370/246; 371/20.5; 375/213; 375/224
[58] Field of Search ..................... 370/221, 241, 370/242, 243, 246, 247, 248, 249, 250, 254; 371/20.5; 395/183.01; 375/213, 221, 224

[56] References Cited

U.S. PATENT DOCUMENTS

| | | | |
|---|---|---|---|
| 4,161,635 | 7/1979 | Wolaver | 370/249 |
| 4,737,949 | 4/1988 | Yamamoto | 375/213 |
| 5,289,474 | 2/1994 | Purcell et al. | 371/20.5 |
| 5,450,394 | 9/1995 | Gruber et al. | 370/253 |
| 5,659,540 | 8/1997 | Chen et al. | 370/249 |

OTHER PUBLICATIONS

"Simplified Loopback Procedures for Frame Relay OAM", Khalid Ahmad et al, CANCOM 13-23, ITU-T Study Group 13, Geneva, Switzerland, Jul. 10-21, 1995.

"Frame Relaying Operation and Maintenance Principles", ITU Telecommunication Standardization Sector, Study Group 13, Standard T1S1.2/94-031R1, Mar. 1994.

"Frame Relay Operation and Maintenance Principles and Functions", ITU-T Telecommunication Standardization Sector, Study Group 13, Draft Recommendation 1.620, Temporary Document 32-E (WP1/13), Geneva, Switzerland, Jul. 1995.

Primary Examiner—Benedict V. Safourek
Attorney, Agent, or Firm—Yoshiharu Toyooka

[57] ABSTRACT

A loopback mechanism uses frame relay OAM loopback frames which eliminate the need for location identifiers and reduces overhead and complexity. The frames replace source and destination loopback location identifiers by a loopback indicator field, a send node count field and a return node count field. The originating node of the loopback procedure sets the number of intermediate frame relay nodes to be traversed. The intermediate frame relay nodes simply increment or decrement the node count, depending on the direction of the loopback frame.

8 Claims, 2 Drawing Sheets

Fig 2

| ATM Header | Common Field | Loopback Identification | Correlation Tag | Loopback Location ID | Source ID | Reserved | CRC-16 |

Fig 3

| Correlation Tag (CT) 7 bits | L B I | Send Node Count (SNC) 1 octet | Return Node Count (RNC) 1 octet | Time Stamp (TS) (Optional) TLV notation | Additional Function Specific Field(s) (Optional) TLV notation |

← Loopback Indicator (LBI) 1 bit

LOOPBACK MECHANISM FOR FRAME RELAY OAM

FIELD OF INVENTION

The invention relates generally to a frame relay OAM procedure. In particular, it is directed to a simplified mechanism for the frame relay OAM loopback procedure which reduces overhead in OAM frames and complexity in frame processing.

BACKGROUND OF INVENTION

It is widely recognized that the use of a simple loopback (LB) function provides necessary OAM capability for fault location, continuity verification, as well as round trip delay (RTD) measurements. It was agreed in the ITU study group to include this function for the future enhancement of frame relay service (FRS) in draft Recommendation I.620. However, the previously proposed LB mechanism in I.620 was analogous to that selected specifically for ATM networks and is not suitable for frame relay (FR) requirements in terms of complexity and overhead.

The OAM LB function for FR needs to be simple and introduce minimum additional processing and bandwidth overhead. However, it should also be flexible to enable additional functionality to be incorporated as required for specific OAM applications. The present invention solves these problems by simplifying the LB OAM procedure, is more efficient than the existing procedure and should be more suitable for the enhancement of future FRS.

OBJECTS OF INVENTION

It is therefore an object of the invention to provide a loopback mechanism for FRS which is simpler and more efficient, requiring less processing.

It is another object of the invention to provide a loopback mechanism for FRS which is more flexible for future enhancement of FRS.

SUMMARY OF INVENTION

Briefly stated, according to one aspect, the invention is directed to a method of performing a loopback function in a telecommunications network. The method comprises a step of the source node sending an FR OAM frame towards a loopback node, the FR OAM frame having a loopback indicator field set to sending, a send node count field set to the number of intermediate frame relay nodes, and a return node count field set to a predetermined value. The method further includes steps of the intermediate frame relay nodes successively incrementing the return node count field when the loopback indicator field is set to sending and forwarding the FR OAM frame downstream; and on the condition that the values of the send node count field and return node count field meet certain criteria, the loopback node looping back to the source node the FR OAM frame which has the loopback indicator field set to loopback.

BRIEF DESCRIPTION OF DRAWINGS

FIG. 2 shows an OAM frame which the ITU-T Study Group 13 attempted to use for loopback services; and FIG. 3 shows an FR OAM loopback frame format according to one embodiment of the invention.

DETAILED DESCRIPTION OF PREFERRED EMBODIMENTS OF INVENTION

Figure 1:
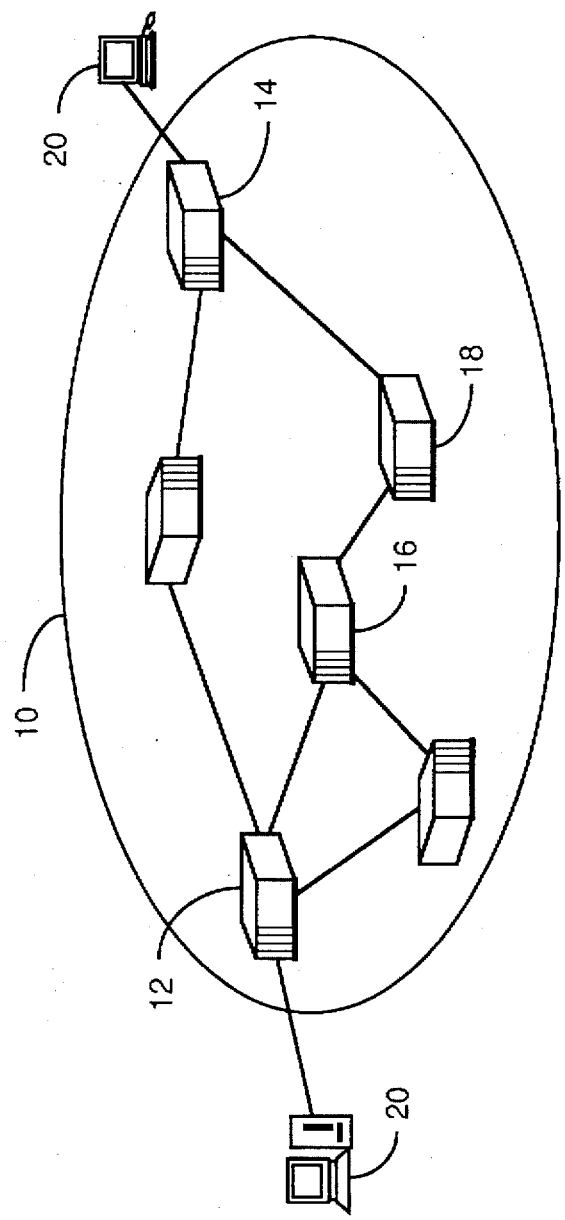
FIG. 1 is a schematic illustration of a telecommunication network which is performing FRS between a source node and a destination node.

FIG. 1 shows schematically a telecommunication network 10 which is holding a connection for FRS between two end nodes 12 and 14. Also shown are a few intermediate FR nodes 16 and 18. End users 20 are also shown as accessing the end nodes. In order to manage FRS properly, nodes periodically, or from time to time, exchange specially designed frames called FR OAM frames. Any FR node can be configured by the management interface to be a participating or a non-participating node for the purposes of the FR LB OAM test.

FIG. 2 is an ATM OAM cell which includes such fields as a loopback location and source ID fields. Previously the ITU-T Study Group 13 proposal for FR OAM attempted to use OAM frames which were of similar structure as shown in FIG. 2. However, this mechanism was found to be too complex for FR OAM requirements.

According to one embodiment of the invention, the LB procedure for FRS can be considerably simplified and overhead reduced by replacing the source and destination LB location identifiers (currently 16 octets each) with a "hop count" mechanism.

FIG. 3 is an FR OAM loopback frame format suitable for the embodiment of the invention.

Correlation Tag (CT): 7 bits

This field is used to correlate the transmitted LB frame with the received LB frame, in conjunction with the Return Node Count value (see below).

Loopback Indicator (LBI): 1 bit

This field provides a Boolean indication as to whether or not the frame has been looped back (Send or Return direction indication). In one embodiment, for a send frame the LBI is set to 1. For a return frame the LBI is set to 0.

Send Node Count (SNC): 1 octet

This field is set by the sending node to indicate the number of FR nodes to be traversed before loopback. If the SNC is set to 0, the LB frame should be passed by every node to the connection end point for initialization purposes as described below. If the SNC is set to all-ones, the LB frame should be passed by every node to the connection end points for the specific case of an end-to-end loopback.

Return Node Count (RNC): 1 octet

The Return Node Count value is incremented by 1 by each FR node traversed if the LBI is set to 1. The RNC value is decremented by 1 by each FR node traversed when the LBI is set to 0.

Time Stamp (TS). Optional. Variable Length

This field may be used to encode a time stamp for Round Trip Delay (RTD) measurements. The format and encoding of the TS field is in accordance with the ASN.1 notation for Type-Length-Value (TLV).

Additional Function Specific Field(s) (FSF): Optional. Variable Length

The format of this field is in accordance with the ASN.1 notation for TLV as for TS. This field(s) may be used for enhancement of other OAM functions such as QOS monitoring etc. and may be implementation specific. This field(s) may be used for additional OAM functions.

Initialization Procedure

Any FR node may determine the number of nodes upstream and downstream for LB purposes by using the Send and Return Node Counts as follows:

The FR node sends the LB frame with SNC=0. LB frames with SNC=0 are used for initialization purposes only and are called Initialization Loopback (ILB) frames. Every FR node passes this frame after incrementing the value of the RNC field by 1 if the LBI is set to 1 (send direction). The connection end point copies the RNC value to the SNC field and sets LBI to 0 before looping back the ILB frame. In the return direction, each node decrements the RNC value by 1 as per the normal procedures described below. The originating node extracts the ILB frame on the condition RNC=0. The value in the SNC field is then the number of nodes in the connection (for the given direction).

For the specific case of end-to-end loopback (SNC=all-ones), the initialization procedure need not be used.

Loopback Procedure

The loopback mechanism according to one embodiment will be described in detail below.

Once the FR node has determined the number of participating nodes involved in the connection using the above initialization procedure in each direction, LB procedures for either end-to-end or segment can proceed normally as follows:

(1) The source node sets the value of the SNC field to the required number of nodes to be traversed before loopback (the LB node). The LBI is set to 1 and a valid correlation tag value (e.g. sequence number) is inserted in the CT field. The RNC is set to 0.

(2) Each node traversed increments the RNC by 1 when the LBI is set to 1.

(3) The condition SNC=RNC determines the loopback point. The LB node sets the LBI to 0 before looping back the LB frame. The LB frame may be copied for subsequent processing of the function specific fields by the management system.

In the return direction (LBI=0), each node decrements the RNC value by 1. The condition RNC=0 identifies the originating node. The originating node extracts (or copies) the LB frame for processing by the management system.

For the specific case of end-to-end loopback, the originating end-point (source node) sets the SNC to all-ones; other procedures are the same as in the general case.

Loopback procedures can be initiated by management action on demand, or by end users as required. Loopback frames may be sent periodically if required. The period is under management control and depends on service requirements.

It should be noted that specific values described above are in connection with one of the embodiments only. There are many values and relationships between some values that can be employed depending upon the operational conditions.

Non-participating Nodes

As described earlier, any FR node may be configured by the management interface to be a participating or a non-participating node for the purposes of the FR LB OAM test. In the case that the node is considered to be non-participating in the LB test, it is required to transparently pass the LB OAM frames. Changes in configuration will require that the ILB frame be used to determine the new number of participating nodes in the connection.

LBI Error Condition

In the event that an LB point does not set the LBI=0 (e.g. as an error condition), the RNC values in the return direction will continue to be incremented, resulting in the originating point not extracting the LB frame. However, in this case, the downstream FR connection end point node will discard the LB frame when it detects the condition where LBI=1 and SNC is not equal to RNC.

What is claimed is:

1. A method of performing a loopback function in a telecommunications network for frame relay services, comprising steps of:

a source node sending an FR OAM frame towards a loopback node, the FR OAM frame having a loopback indicator field set to sending, a send node count field set to the number of intermediate frame relay nodes and a return node count field set to a predetermined value;

intermediate frame relay nodes successively incrementing the return node count field when the loopback indicator field is set to sending and forwarding the FR OAM frame downstream; and on the condition that the values of the send node count field and return node count field meet certain criteria, the loopback node setting the loopback indicator field to loopback and looping back to the source node the FR OAM frame.

2. In a telecommunications network which is holding a connection between a source node and a destination node for frame relay services, the connection containing one or more intermediate frame relay nodes, a method of performing a loopback function comprising steps of:

the source node sending an FR OAM frame towards the loopback node, the FR OAM frame having a loopback indicator field set to sending, a send node count field set to the number of intermediate frame relay nodes and a return node count field set to a predetermined value;

the intermediate frame relay nodes successively incrementing the return node count field when the loopback indicator field set is to sending and forwarding the FR OAM frame downstream; and on the condition that the values of the send node count field and return node count field meet certain criteria, the loopback node looping back to the source node the FR OAM frame which has the loopback indicator field set to loopback.

3. The method according to claim 2, further comprising steps of the intermediate frame relay nodes forwarding the FR OAM frame towards the source node when the loopback indicator field is set to loopback, after having decremented the return node count field.

4. The method according to claim 3, further comprising steps of the source node sending an initialization FR OAM frame towards the loopback node, the initialization FR OAM frame having the source node count field set to a predetermined value.

5. The method according to claim 3, further comprising steps of:

the source node sending an end-to-end loopback frame, the end-to-end loopback frame having the send node count field set to a particular value; and the destination node looping back to the source node the end-to-end loopback frame, which has the loopback indicator field set to loopback.

6. In a telecommunications network which is holding a connection between a source node and a destination node for frame relay services, the connection containing one or more intermediate frame relay nodes, a method of performing a loopback function comprising steps of:

the source node sending an FR OAM frame towards the destination node, the FR OAM frame having a loopback indicator field set to sending, a send node count field set to the number of intermediate frame relay nodes and a return node count field set to 0;

the intermediate frame relay nodes successively incrementing the return node count field by one when the loopback indicator field is set to sending and forwarding the FR OAM frame downstream towards the destination node; and on the condition that the send node count field value equals the return node count field value, the destination node looping back to the source node the FR OAM frame which has the loopback indicator field set to loopback.

7. The method of performing a loopback function according to claim 6 further comprising steps of:

the source node sending an FR OAM initialization frame towards the destination node, the FR OAM initialization frame having a loopback indicator field set to sending, a send node count field set to 0 and a return node count field set to 0; and the destination node copying the value of the send node count field and looping back to the source node the FR OAM initialization frame which has the loopback indicator field set to loopback.

8. The method of performing a loopback function according to claim 6 further comprising steps of:

the source node sending an end-to-end loopback frame, the end-to-end loopback frame having the send node count field set to all ones, and the destination node looping back to the source node the end-to-end loopback frame, which has the loopback indicator field set to loopback.

* * * * *